US007263773B2

(12) United States Patent
Lee et al.

(10) Patent No.: US 7,263,773 B2
(45) Date of Patent: Sep. 4, 2007

(54) METHOD OF MANUFACTURING A BUBBLE-JET TYPE INK-JET PRINTHEAD

(75) Inventors: Chung-jeon Lee, Seoul (KR); Jae-ho Moon, Suwon (KR); O-keun Kwon, Suwon (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 208 days.

(21) Appl. No.: 10/798,577

(22) Filed: Mar. 12, 2004

(65) Prior Publication Data

US 2004/0169700 A1 Sep. 2, 2004

Related U.S. Application Data

(62) Division of application No. 09/798,954, filed on Mar. 6, 2001, now Pat. No. 6,726,308.

(30) Foreign Application Priority Data

Jul. 24, 2000 (KR) .............................. 2000-42365

(51) Int. Cl.
*B21D 53/76* (2006.01)
*B41J 2/14* (2006.01)
*G01D 15/00* (2006.01)

(52) U.S. Cl. ......................... 29/890.1; 29/611; 29/846; 29/847; 29/852; 347/48; 216/27

(58) Field of Classification Search ............... 29/890.1, 29/611, 846, 847, 852; 216/18, 27; 427/101, 427/402, 407.1, 282; 347/48, 56, 65, 45
See application file for complete search history.

(56) References Cited

U.S. PATENT DOCUMENTS 4,716,423 A * 12/1987 Chan et al. .................. 347/65
4,847,630 A * 7/1989 Bhaskar et al. ............... 347/63
4,882,595 A * 11/1989 Trueba et al. ................. 347/85
5,308,442 A * 5/1994 Taub et al. .................... 216/27
5,387,314 A * 2/1995 Baughman et al. ........... 216/27
5,685,491 A * 11/1997 Marks et al. .......... 239/533.12
5,818,478 A * 10/1998 Gibson ........................ 347/45
5,880,762 A 3/1999 Ishinaga et al.

(Continued)

FOREIGN PATENT DOCUMENTS

EP 0 317 171 5/1989

(Continued)

*Primary Examiner*—A. Dexter Tugbang
*Assistant Examiner*—Tai Van Nguyen
(74) *Attorney, Agent, or Firm*—Robert E. Bushnell, Esq.

(57) ABSTRACT

A method of manufacturing a bubble-jet type ink jet printhead. The method includes forming resistive heater elements on a substrate, forming a patterned electrode layer on the resultant structure, forming an insulating layer over the resultant structure, forming barrier walls on the resultant structure and attaching a nozzle plate on the resultant structure. The method may further include etching a hole in the insulating layer, forming a second electrode layer over the etched insulating layer to contact the resistive heater elements and forming a second insulating layer thereon, where the barrier walls and then the nozzle plate are formed on top of the second insulating layer. The barrier walls group together resistive heater elements in pairs and form barriers between different pairs of resistive heater elements.

20 Claims, 14 Drawing Sheets

U.S. PATENT DOCUMENTS

| | | | | |
|---|---|---|---|---|
| 6,039,439 | A * | 3/2000 | Komplin et al. | 347/65 |
| 6,042,222 | A * | 3/2000 | Moritz et al. | 347/65 |
| 6,273,557 | B1 | 8/2001 | Milligan et al. | |
| 6,766,817 | B2 | 7/2004 | da Silva | |
| 2002/0008741 | A1 | 1/2002 | Temple et al. | |
| 2002/0021327 | A1 | 2/2002 | Ingham et al. | |

FOREIGN PATENT DOCUMENTS

| | | |
|---|---|---|
| JP | 59-124865 | 7/1984 |
| JP | 59-207262 | 11/1984 |
| JP | 08-48034 | 2/1996 |
| JP | 09-48121 | 2/1997 |
| JP | 10-128977 | 5/1998 |
| JP | 11-20161 | 1/1999 |

* cited by examiner

METHOD OF MANUFACTURING A BUBBLE-JET TYPE INK-JET PRINTHEAD

CROSS-REFERENCE TO RELATED APPLICATIONS

This application is a divisional application of U.S. patent application Ser. No. 09/798,954 filed on 6 Mar. 2001 now U.S. Pat. No. 6,726,308. This related application is relied on and incorporated herein by references in its entirety.

CLAIM OF PRIORITY

This application makes reference to, incorporates the same herein, and claims all benefits accruing under 35 U.S.C. §119 from my application entitled BUBBLE-JET TYPE INK-JET PRINTHEAD filed with the Korean Industrial Property Office on Jul. 24, 2000 and there duly assigned Ser. No. 2000/42365.

BACKGROUND OF THE INVENTION

1. Field of the Invention

The present invention relates to an ink-jet printhead, and more particularly, to a bubble-jet type ink-jet printhead.

2. Description of the Related Art

The ink ejection mechanisms of an ink-jet printer are largely categorized into two types: an electro-thermal transducer type (bubble-jet type) in which a heat source is employed to form a bubble in ink causing ink droplets to be ejected, and an electromechanical transducer type in which a piezoelectric crystal bends to change the volume of ink causing ink droplets to be expelled.

Meanwhile, a bubble-jet type ink-jet printhead having an ink ejector needs to meet the following conditions. First, a simplified manufacturing process, the low manufacturing cost, and high volume production must be allowed. Second, to produce high quality color images, creation of small and minute satellite droplets that trail ejected main droplets must be prevented. Third, when ink is ejected from one nozzle or ink refills an ink chamber after ink ejection, cross-talk with adjacent nozzles from which no ink is ejected must be prevented. Fourth, for a high speed print, a cycle beginning with ink ejection and ending with ink refill must be as short as possible.

However, the above conditions tend to conflict with one another, and furthermore, the performance of an ink-jet printhead is closely related to the structures of an ink chamber, an ink channel, and a heater, the type of formation and expansion of bubbles associated therewith, and the relative size of each component.

In efforts to overcome problems related to the above requirements, ink-jet print heads having a variety of structures have been proposed in U.S. Pat. Nos. 4,339,762; 4,882,595; 5,760,804; 4,847,630; and 5,850,241, European Patent No. 317,171, and Fan-Gang Tseng, Chang-Jin Kim, and Chih-Ming Ho, "A Novel Micoinjector with Virtual Chamber Neck", IEEE MEMS '98, pp.57-62. However, ink-jet printheads proposed in the above patents and literature may only satisfy some of the aforementioned requirements but do not completely provide an improved ink-jet printing approach.

SUMMARY OF THE INVENTION

To solve the above problems, it is an objective of the present invention to provide a bubble-jet type ink-jet printhead having a structure for effectively preventing a back flow of ink.

It is another objective of the present invention to provide a bubble-jet type ink-jet printhead in which an ink channel, along which ink flows, has a simple structure and ink is supplied smoothly.

It is still another objective of the present invention to provide a bubble-jet type ink-jet printhead that allows for minute adjustment in an ink ejection amount and ejection of a fixed amount.

It is yet still another objective of the present invention to provide a bubble-jet type ink-jet printhead that allows for high-speed operation by shortening an ink refill time.

It is further an object of the present invention to provide an inkjet printhead that produces uniform droplet size.

It is still further an object of the present invention to provide an ink jet ejection mechanism that has two heater units for each nozzle hole;

It is also an object of the present invention to provide an ink chamber that can be filled from two directions.

Accordingly, to achieve the above objectives, the present invention provides a bubble-jet type ink jet printhead including a substrate, a plurality of chamber walls arranged parallel to one another on the substrate for dividing a chamber into a plurality of unit chambers having a predetermined height, which are ink flow areas, a bubble generating means, provided for each unit chamber, which includes two unit heaters spaced apart by a predetermined distance on the substrate, and a nozzle plate, combined above the substrate, in which a plurality of nozzles are formed, each nozzle corresponding to a region between the two unit heaters of each bubble generating means. In the ink-jet printhead, ink is supplied from both sides of the unit chamber.

Furthermore, the two unit heaters of each bubble generating means are electrically coupled to each other. The two unit heaters may be integrated or spaced apart by a predetermined distance, between which an electrical connection member is disposed.

The opposite portions of the two unit heaters of the bubble generating means may be coupled to a common signal line and the exterior ends of the two unit heaters may be commonly coupled to one parallel connection member. Alternatively, the ends of one side of each bubble generating means are coupled to a serial connection member while the ends of the other side are coupled to electrical signal lines, respectively. The exterior ends of the two unit heaters of the bubble generating means may be connected to the parallel connection member integrated therewith, and the common signal line may be commonly coupled to the middle portions of a plurality of bubble generating means.

A first insulating layer may be disposed between the common signal line and the bubble generating means, and a contact hole for contacting the common signal line and a connection portion of both unit heaters of the bubble generating means may be formed in the first insulating layer. A second insulating layer may be formed on the uppermost surface of a stack structure including the bubble generating means and the chamber wall is formed on the second insulating layer.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1A:
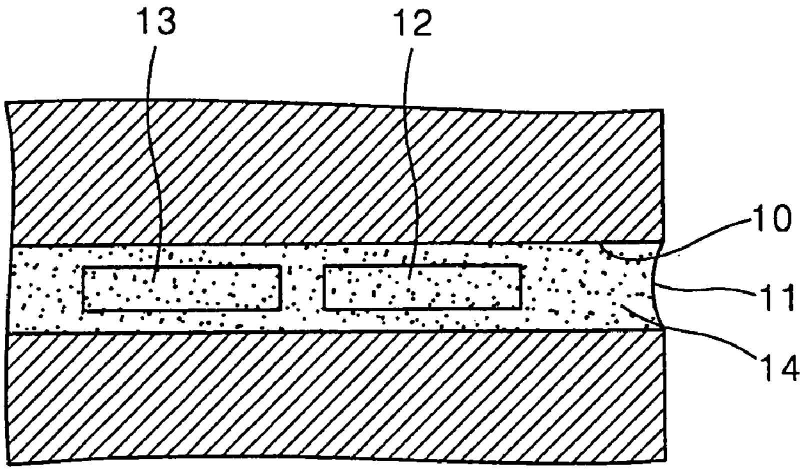
FIGS. 1A and 1B are cross-sectional views showing the structure of a conventional bubble-jet type ink-jet printhead along with ink ejection mechanism.
Figure 1B:
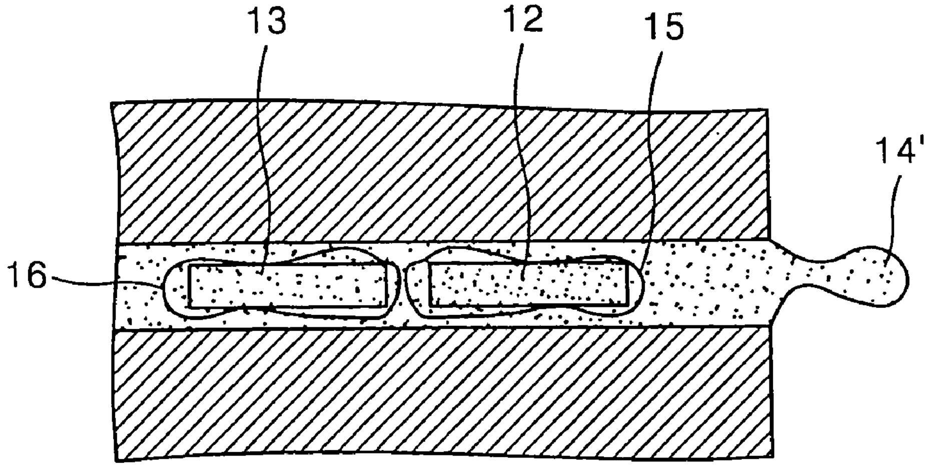

Referring to FIGS. 1A and 1B, a bubble-jet type ink ejection mechanism will now be described. When a current pulse is applied to a heater 12 consisting of resistive heating elements located at an ink channel 10 where a nozzle 11 is formed, heat generated by the heater 12 boils ink 14 forming a bubble 15 within the ink channel 10, which causes an ink droplet 14' to be ejected. A back flow of ink in the opposite direction of a nozzle must be avoided during ink ejection. Another heater 13 in FIGS. 1A and 1B is provided for this purpose.

Figure 2:
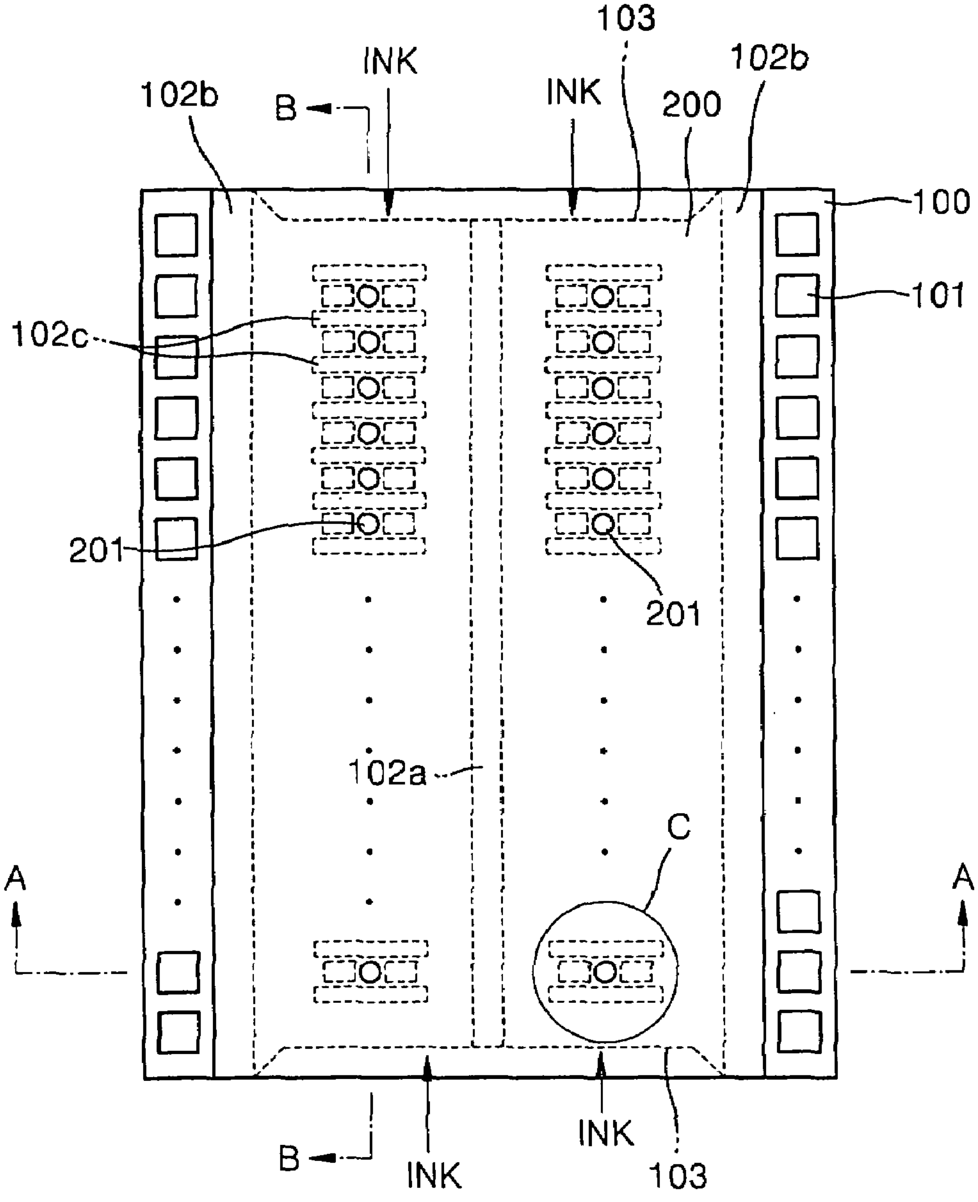
FIG. 2 is a schematic top view of a bubble-jet type ink-jet printhead according to an embodiment of the present invention.
Figure 3:
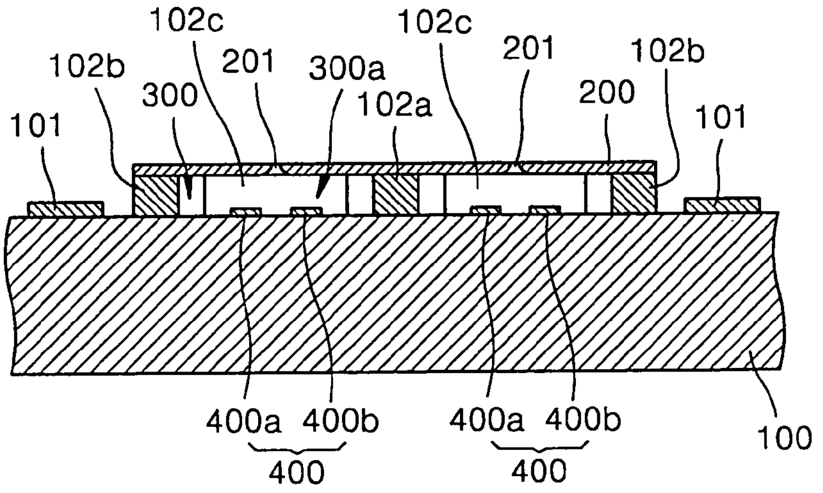
FIG. 3 is a cross-sectional view taken along line A-A of FIG. 2.

A heater is mainly shown in FIGS. 2 and 3, and components related thereto are omitted to aid in the understanding, and the detailed structure of the heater will be described separately. FIGS. 2 and 3 schematically show an ink-jet printhead having a structure in which nozzles 201 are arranged in two rows. Referring to FIGS. 2 and 3, a plurality of electrode pads 101 are arranged at predetermined intervals along both edges in the longitudinal direction of the substrate 100. A nozzle plate 200, in which the nozzles 200 are arranged in two rows, is disposed at the upper portion of the substrate 100. An isolation wall 102*a* extending from the middle portion of the substrate 100 in a longitudinal direction is disposed between the substrate 100 and the nozzle plate 200, and outer walls 102*b* are disposed along both edges in the longitudinal direction of the nozzle plate 200. Thus, an ink chamber 300 disposed between the substrate 100 and the nozzle plate 200 is partitioned into two, and ink is supplied to the ink chamber 300 through ink feed grooves 103 formed at both short sides of the substrate 100.

Meanwhile, a plurality of chamber walls 102*c* extending in a direction vertical to both outer walls 102*b* and the isolation wall 102*a* are arranged parallel to one another between each of the outer walls 102*b* and the isolation wall 102*a* in a direction in which the outer walls 102*b* and the isolation wall 102*a* extend. Both ends of the chamber wall 102*c* are separated from the outer wall 102*b* and the isolation wall 102*a* by a predetermined space. A unit chamber 300*a* isolated by the chamber wall 102*c* is provided for each nozzle, and the unit chambers 300*a* are connected to one another through openings between the ends of the chamber walls 102*c*. Unit heaters 400*a* and 400*b* constituting a symmetrical bubble generator 400 are disposed at the lower portion of the unit chamber 300*a*. As will be described later, the two unit heaters 400*a* and 400*b* of the bubble generator 400 for each nozzle 201 or unit chamber 300*a* are electrically coupled to each other, and the heaters 400*a* and 400*b* may have either parallel or serial connection structure. Also, both unit to heaters 400*a* and 400*b* are arranged in a straight line parallel to the chamber walls between the chamber walls 102*c*, and the heaters 400*a* and 400*b* generate the same thermal energy, which causes bubbles of the same size to be formed.

Figure 4:
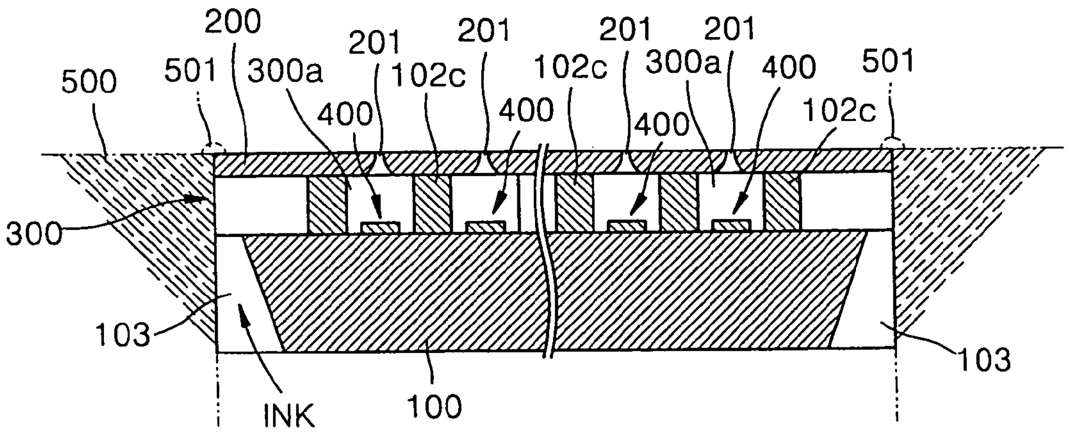
FIG. 4 is a cross-sectional view taken along line B-B of FIG. 2.
Figure 5:
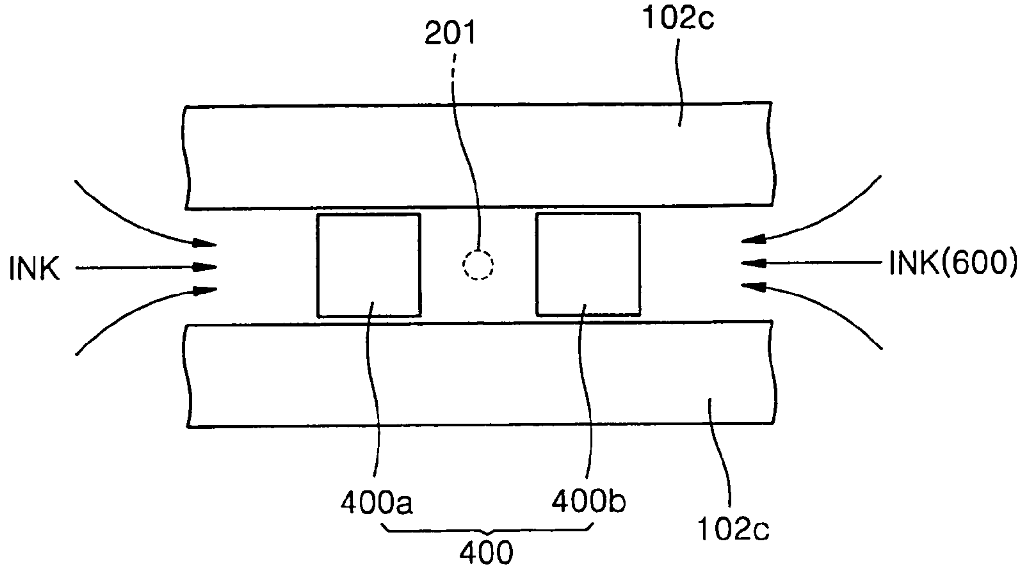
FIG. 5 is an extracted view showing the portion C of FIG. 2.

As shown in FIGS. 3 and 5 in detail, the nozzle 201 of the nozzle plate 200 is located at the upper center between the unit heaters 400*a* and 400*b*. Referring to FIG. 4, which is a cross-sectional view taken along line B-B of FIG. 2, the ink feed grooves 103 are disposed at both ends of the substrate 100. Reference numerals 500 and 501 denote a portion of an ink cartridge for storing ink and a sealing material for sealing the gap between the ink cartridge 500 and the nozzle plate 200.

Figure 6:
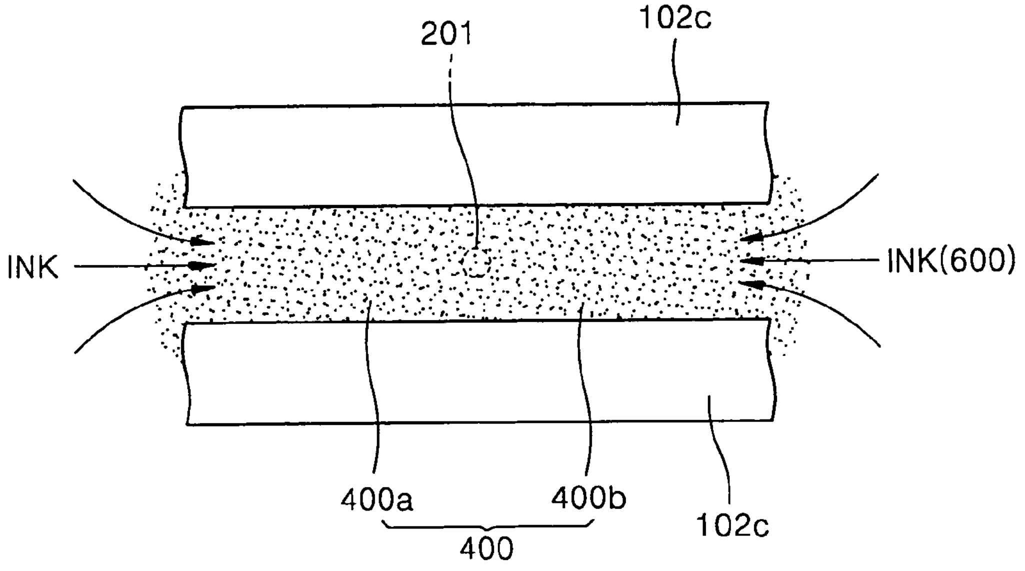
FIGS. 6-9B show an ink ejection process for a bubble-jet type ink-jet printhead according to the present invention.
Figure 7:
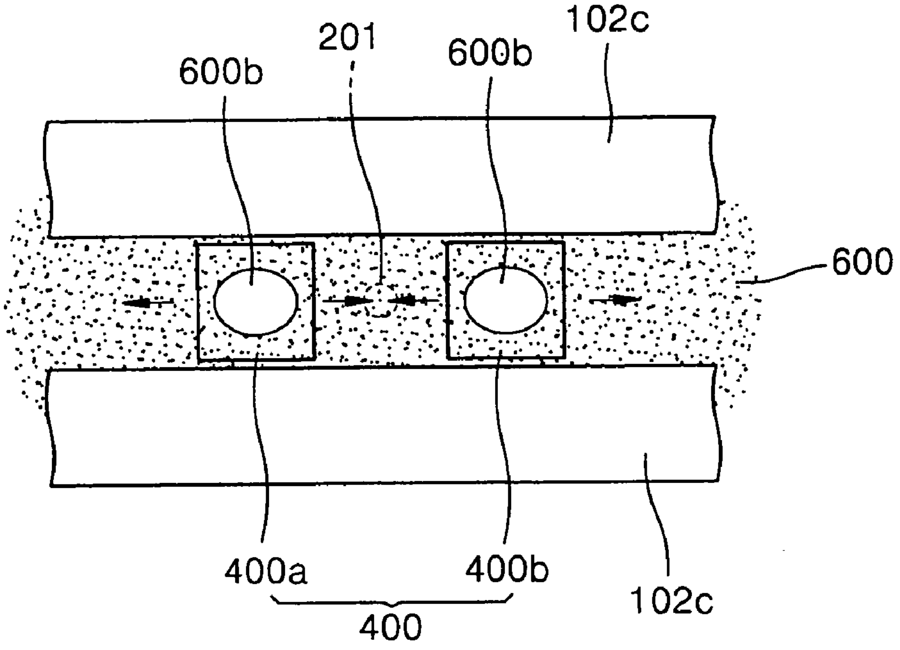

An ink ejection process in the ink-jet printhead according to the present invention having a distinctive structure as described above will now be described. FIG. 6 shows a state in which ink fills the unit chamber 300*a*. Ink 600 is introduced from both sides of the unit chamber 300*a*. In this case, the ink 600 is filled by capillary action and gravity. FIG. 7 shows an early stage at which bubbles are formed at a region in contact with the unit heaters 400*a* and 400*b* upon application of a voltage pulse to the unit heaters 400*a* and 400*b* of the bubble generator 400. In this case, bubbles 600*b* are generated by the unit heaters 400*a* and 400*b* disposed on both sides of a central axis that passes through the nozzle 201. As the bubbles 600*b* expand, pressure is applied to the ink 600 present between the bubbles 600*b* and the ink 600 on the outside thereof, causing a back flow of a small amount of ink 600.

Figure 8:
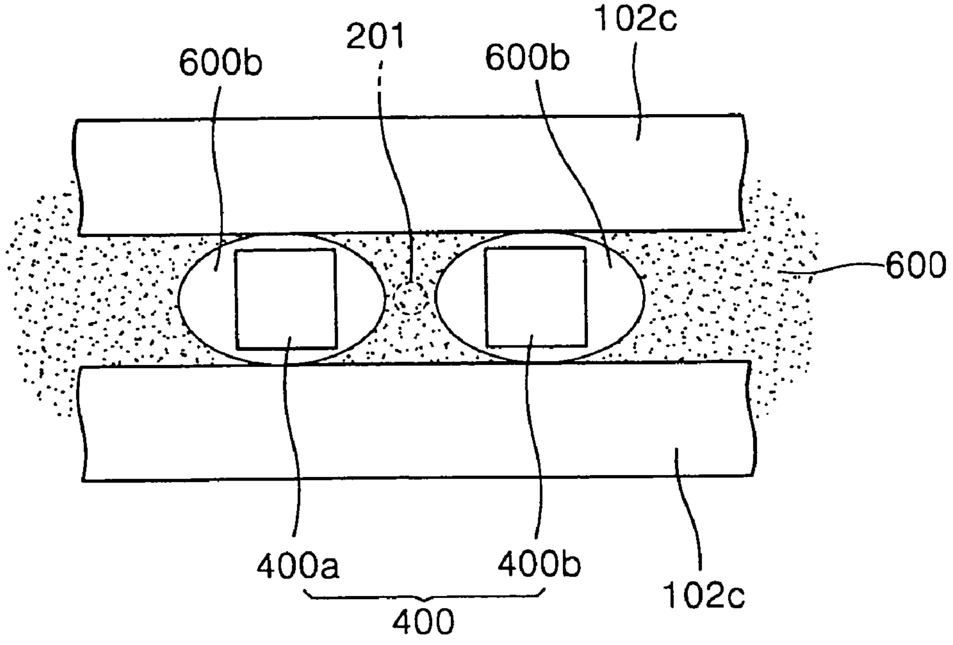

FIG. 8 shows a state in which the bubbles 600*b* formed by the unit heaters 400*a* and 400*b* expand so that a region between the bubbles 600*b* is closed as a voltage pulse continues to be applied to the unit heaters 400*a* and 400*b* of the bubble generator 400. Thus, the ink 600 present in the closed region by the bubbles 600*b*, that is, a region below the nozzle 201, begins to be ejected through the nozzle 201 by force applied by the expansion of the bubbles 600*b*.

Figure 9A:
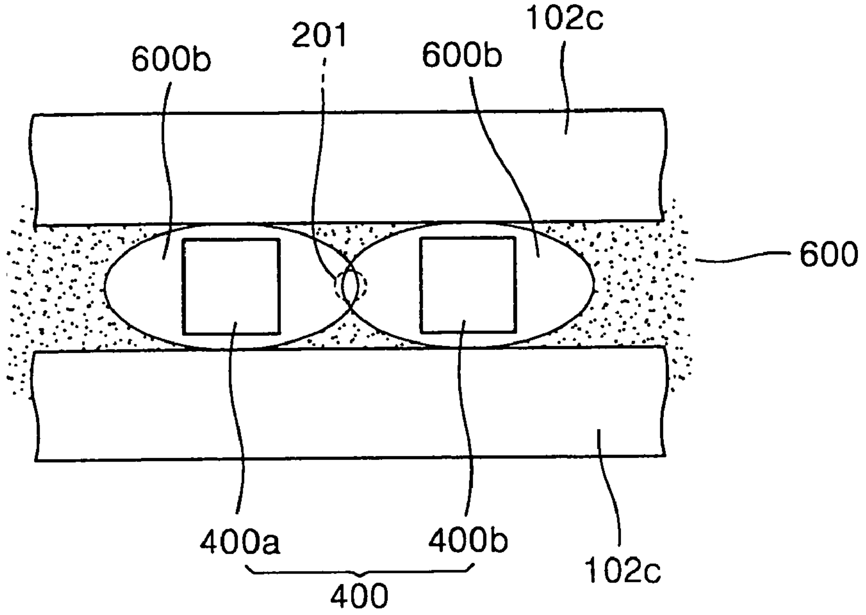
Figure 9B:
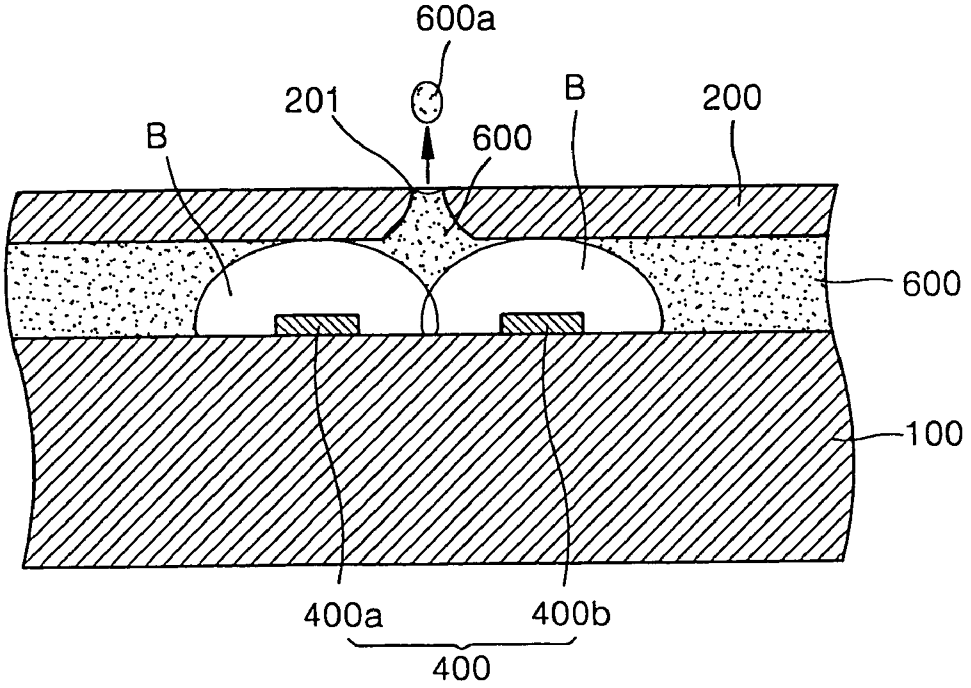

FIG. 9A is a top view showing a state in which the bubbles 600*b* generated by the unit heaters 400*a* and 400*b* reach their maximum growth as application of a voltage pulse to the unit heaters 400*a* and 400*b* of the bubble generator 400 continues to complete ejection of the ink 600 present in the closed region between the bubbles 600*b* through the nozzle 201, and FIG. 9B is a side view showing the same state.

As shown in FIGS. 9A and 9B, the bubbles 600*b* fully expanded by the unit heaters 400*a* and 400*b* cause the ink 600 between the bubbles 600*b* to be ejected in droplets 600*a*. At the same time that ejection of the droplet 600*a* is complete in this way, a voltage ceases to be applied to the unit heaters 400*a* and 400*b* of the bubble generator 400 and hence the bubbles 600*b* that have reached maximum growth collapse and the ink 600 begins to refill. Thus, the process returns to an initial state shown in FIG. 5.

The structural features of the ink-jet printhead according to the present invention that ejects ink droplet through the above process are to include an isolated unit chamber provided for each nozzle and a bubble generator consisting of unit heaters disposed on both sides of the nozzle. Due to the structural features, as both bubbles generated by both unit heaters grow, ink below the nozzle is separated or isolated from the ink on the outside of the bubbles, thus preventing a back flow of the ink present below the nozzle. Furthermore, the ink below the nozzle is isolated by both bubbles and sufficient pressure is exerted on the ink, so as to generate a droplet which will be ejected with high pressure. Further, due to the structural features, it is possible to minutely adjust the size of a droplet ejected depending on the amount of heat generated by the bubble generator. The ink-jet printhead according to the present invention includes an ink channel having a simple structure unlike a conventional printhead, thereby effectively preventing the clogging of an ink channel due to foreign materials or the occurrence of cross-talk with adjacent regions.

Figure 10:
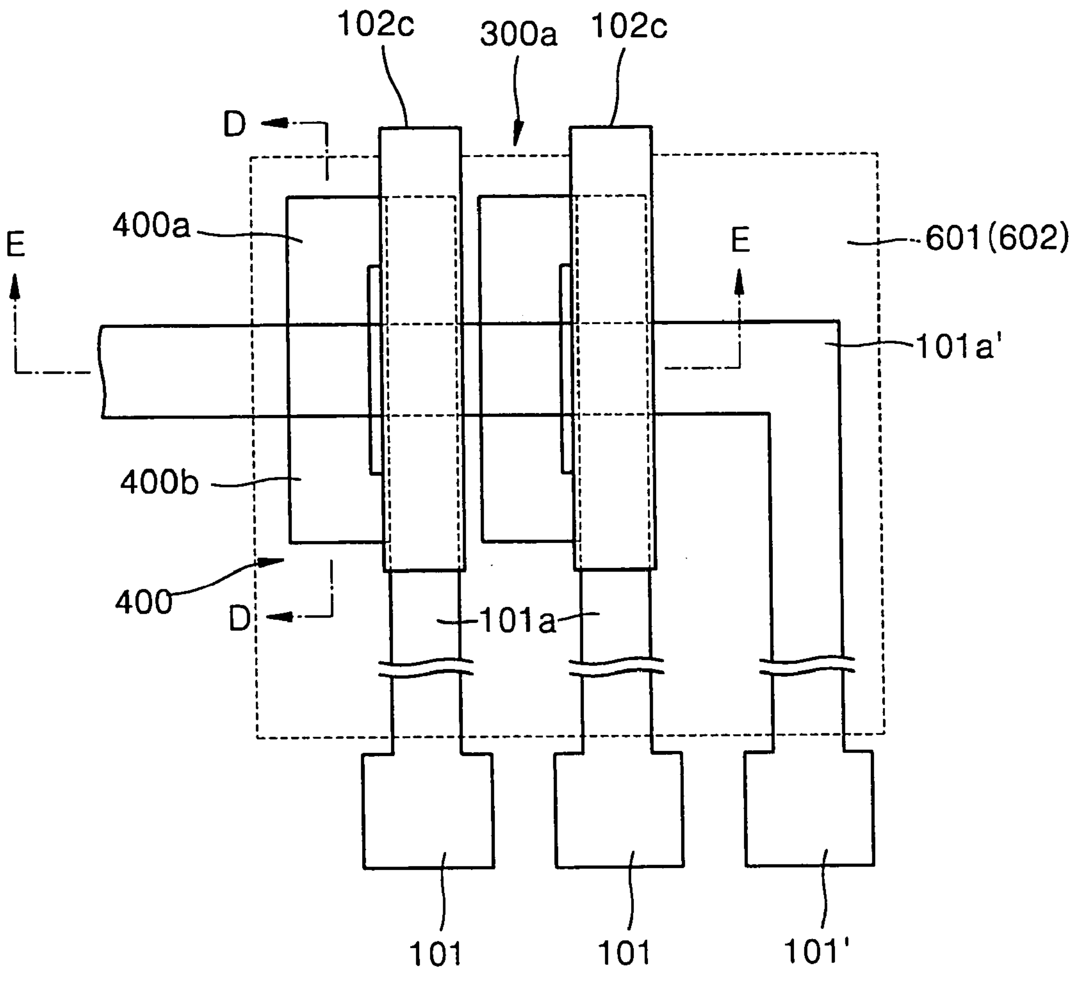
FIG. 10 is a top view showing the structure of a region around one unit chamber in the bubble-jet type ink-jet printhead according to the present invention.
Figure 11:
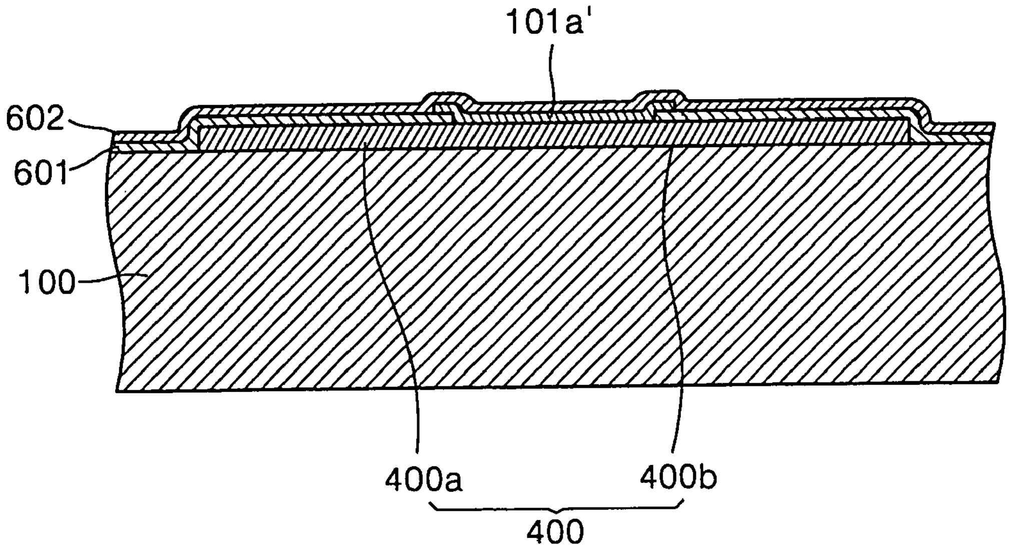
FIG. 11 is a cross-sectional view taken along line D-D of FIG. 10.

The detailed structure of the heaters 400*a* and 400*b* will now be described. FIG. 10 is a top view showing the arrangement structure of a portion around the unit chamber 300*a*. 601 and 602 denote insulating layers for insulating signal lines 101*a* and 101*a*' connected to the bubble generator 400 from each other. First, referring to FIGS. 10 and 11, the two unit heaters 400*a* and 400*b* of the bubble generator 400 unite into a single body, the middle portion of which is in contact with the common signal line 101*a*' coupled to the common electrode pad 101'. Thus, a resistance component at the portion in contact with the common signal line 101*a*' is shorted out of the circuit by the common signal line 101*a*' and hence both unit heaters 400*a* and 400*b* are connected in series by the common signal line 101*a*'. The common signal line 101*a*' is coupled to another bubble generator 400 as well. Further, the first insulating layer 601 is formed at a portion excluding the common signal line 101*a*' in the middle portion of the bubble generator 400, while the second insulating layer 602 is formed over the common signal line 101*a*' and the bubble generator 400.

Figure 13:
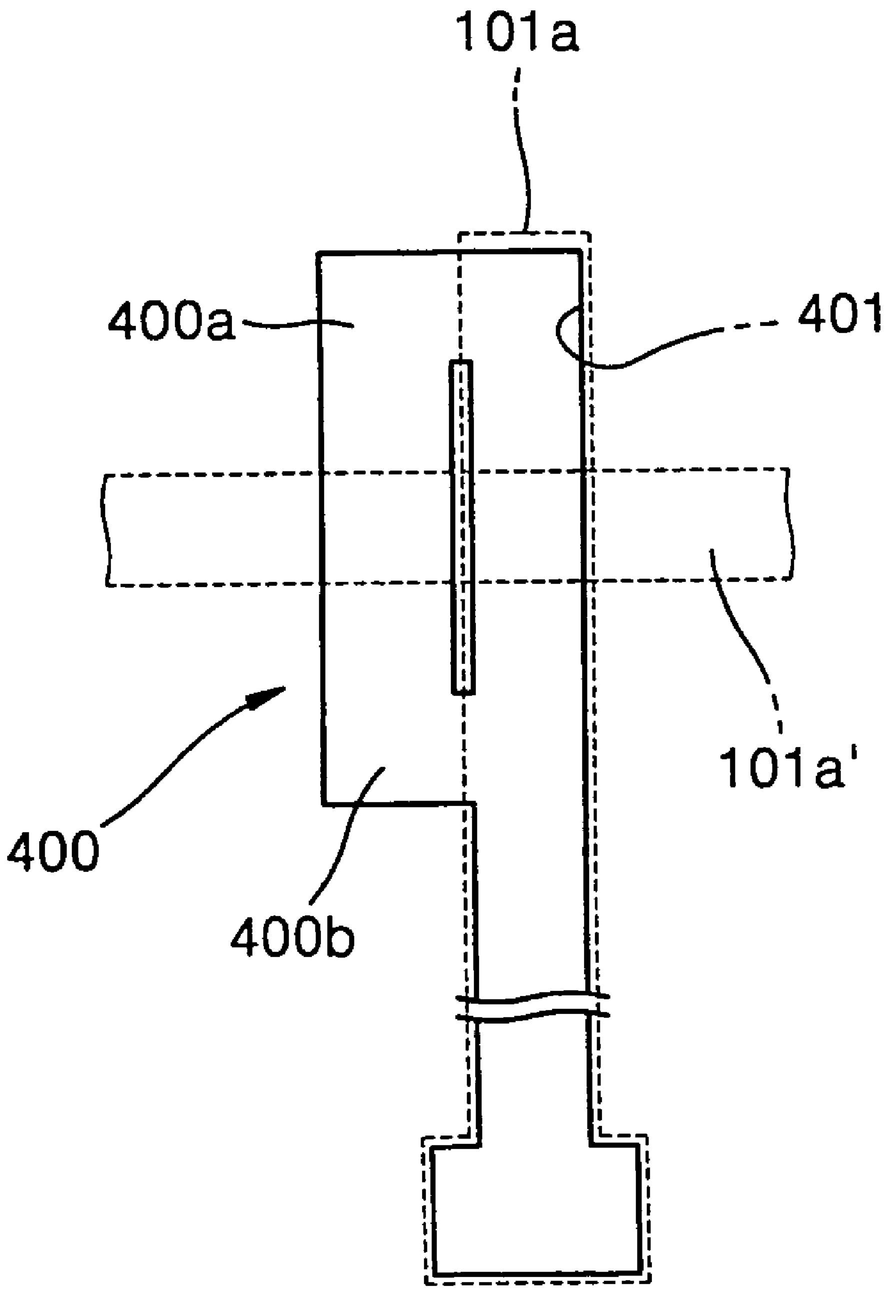
FIG. 13 illustrates a view of the electrical connections of a single bubble generator according to a first embodiment of the present invention.

FIG. 13 illustrates a view of the electrical connections of a single bubble generator according to the first embodiment of the present invention. Meanwhile, as shown in FIG. 13, a parallel connector 401, which is integrated with the bubble generator 400 and electrically connected to both ends of the bubble generator 400, is formed on one side of the bubble generator 400, on top of which an individual signal line 101*a* is formed. The individual signal line 101*a* extends longitudinally to be connected to the electrode pad 101. The individual signal line 101*a* and the electrode pad 101 are integrated with each other and formed on the parallel connector 401 consisting of resistors thus removing resistance component of the parallel connector 401 by an electrical short.

Figure 12:
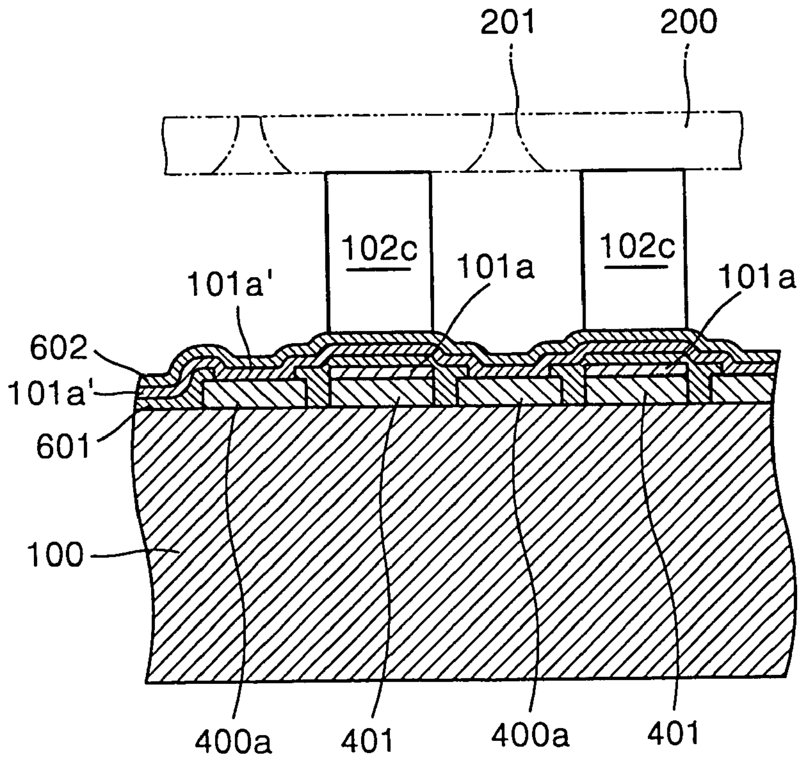
FIG. 12 is a cross-sectional view taken along line E-E of FIG. 10.

As shown in FIG. 12, the first insulating layer 601 is interposed between the parallel connector 401 and the common signal line 101*a*', thereby electrically separating the parallel connector 401 and individual signal line 101*a* from the common signal line 101*a*'. The second insulating layer 602 is positioned on the uppermost surface of the stack structure thereby protecting the unit heaters 400*a* and 400*b* of the bubble generator 400 from ink. The chamber wall 102*c*, the top surface of which contacts the bottom of the nozzle plate 200, is formed on the second insulating layer 602 with a predetermined height.

Figure 14:
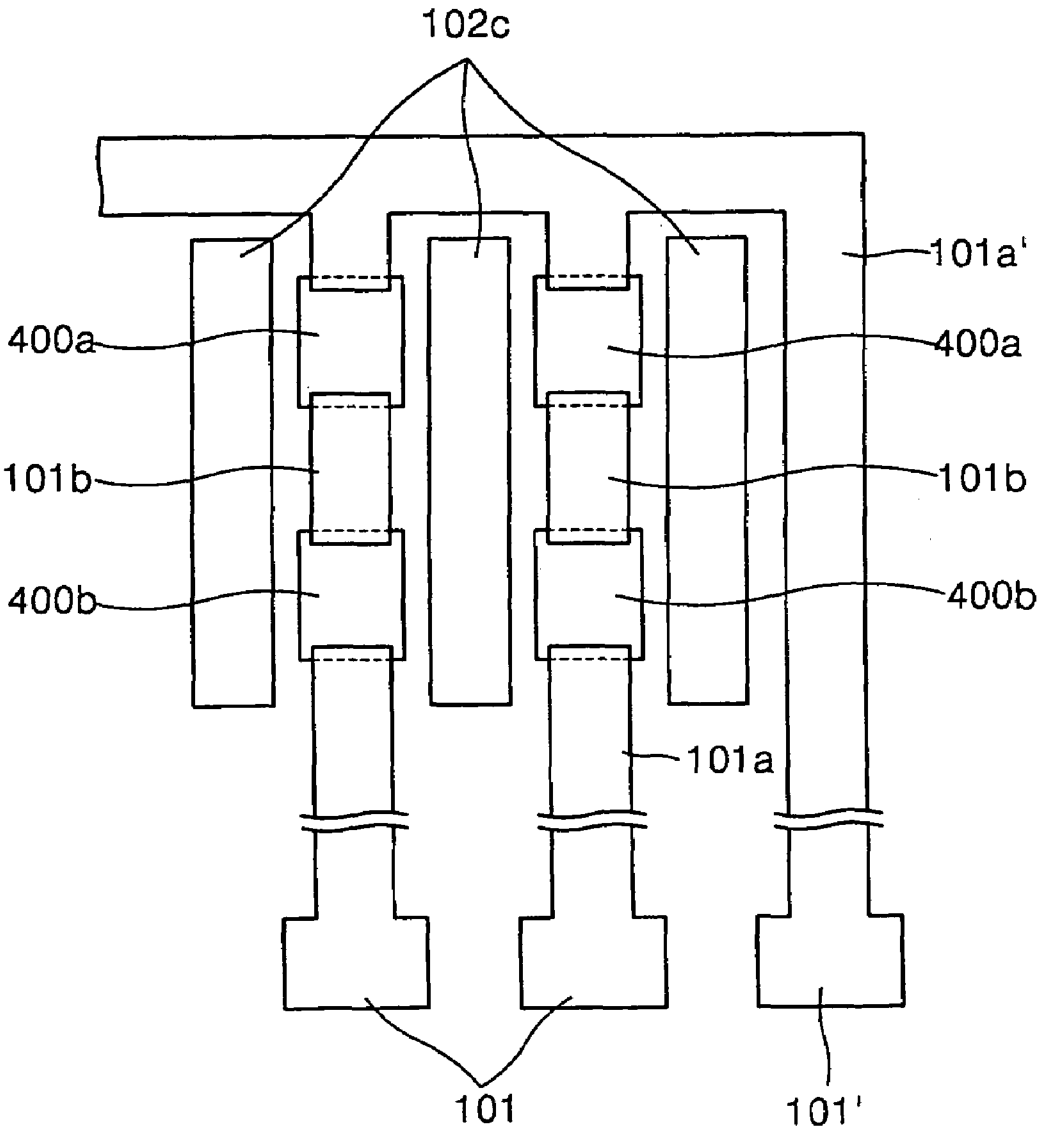
FIG. 14 illustrates a second embodiment of the present invention having a serial electrical connection structure.

In the bubble generator 400 and a peripheral structure associated therewith, the unit heaters 400*a* and 400*b* of the bubble generator 400 are electrically coupled to each other in parallel between the common signal line 101*a*' and the individual signal line 101*a* formed on the parallel connector 401. The parallel connection structure may be modified to a serial connection structure by appropriate arrangement of the signal lines. FIG. 14 illustrates a second embodiment of the present invention having this serial connection structure. In this case, as shown in FIG. 14, both unit heaters 400*a* and 400*b* of the bubble generator 400 are separated from each other, between which a serial connection unit 101*b* is interposed. Also, the outer portions of the unit heaters 400*a* and 400*b* may be coupled to a common signal line 101' and an individual signal line 101, respectively. In this case, the unit heaters 400*a* and 400*b* may be integrally connected and the serial connector 101*b* stacked on the middle portion of the integrated unit heater 400*a* and 400*b* corresponding to a nozzle, thereby obtaining the same serial connection effect.

The serial connector 101*b* can be applied to the bubble generator 400 shown in FIGS. 10-13. In this case, the unit heaters 400*a* and 400*b* integrally formed are separated and the serial connector 101*b* is interposed between the unit heaters 400*a* and 400*b*. The common signal line 101*a*' is connected to the serial connector 101*b*.

Figure 15A:
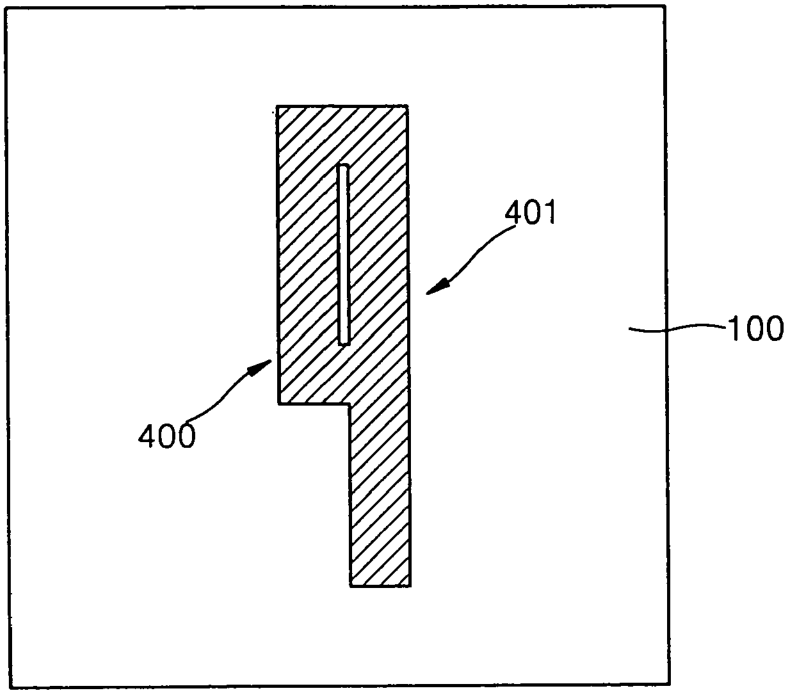
FIGS. 15A-15H show a process of forming a bubble generator applied to the bubble-jet type ink-jet printhead according to the present invention.

To aid in the understanding on the structures of the bubble generator 400 shown in FIGS. 10-13 and the bubble generator shown in FIG. 14, which is an applied example of the bubble generator shown in FIGS. 10-13, a process of forming the bubble generator 400 shown in FIGS. 10-13 will now be described. As shown in FIG. 15A, after having deposited a resistive material such as TaAl over the silicon substrate 100, the resistive material is etched by photolithography to form the bubble generator 400 and the parallel connector 401.

Figure 15B:
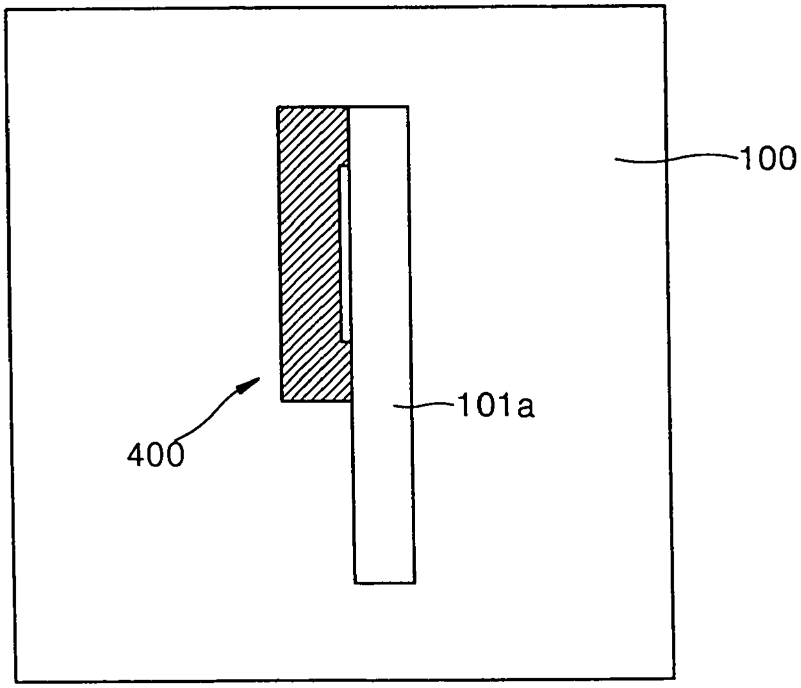
Figure 15C:
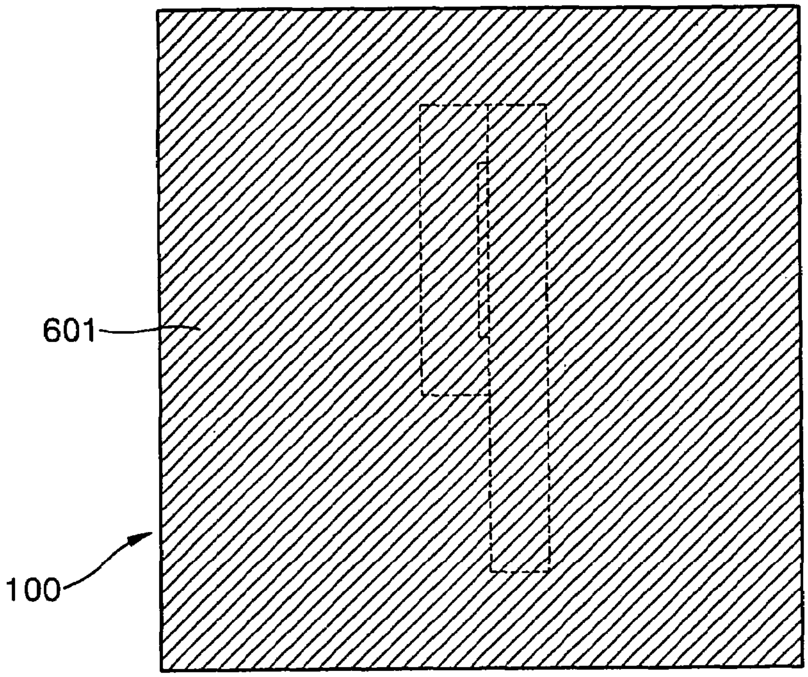
Figure 15D:
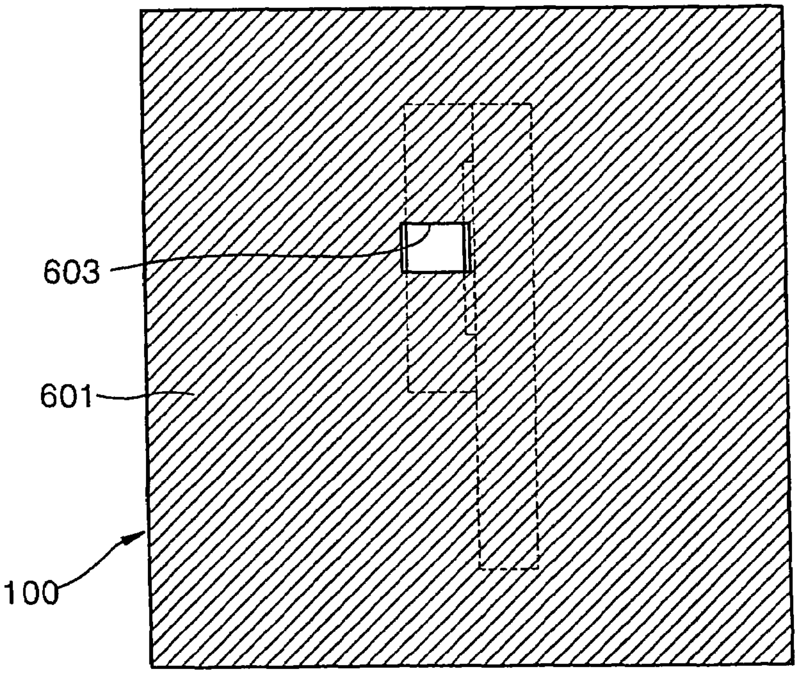

As shown in FIG. 15B, the individual signal line 101*a* is formed of a material having a high conductivity such as Al on the parallel connector 401 by means of deposition and etching. As shown in FIG. 15C, the first insulating layer 601 is formed over the substrate 100. As shown in FIG. 15D, a contact hole 603 is formed at the middle portion of the bubble generator 400 by photolithography.

Figure 15E:
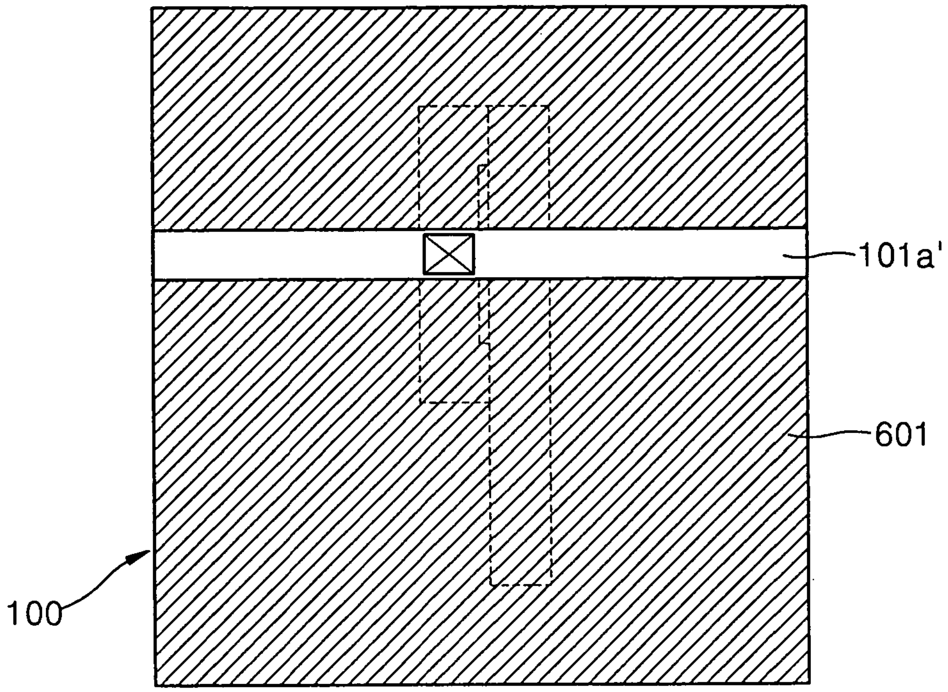

As shown in FIG. 15E, a material having a high conductivity such as Al is deposited over the first insulating layer 601 and then etched to form the common signal line 101*a*' which intersects the bubble generator 400 and overlaps the contact hole 603.

Figure 15F:
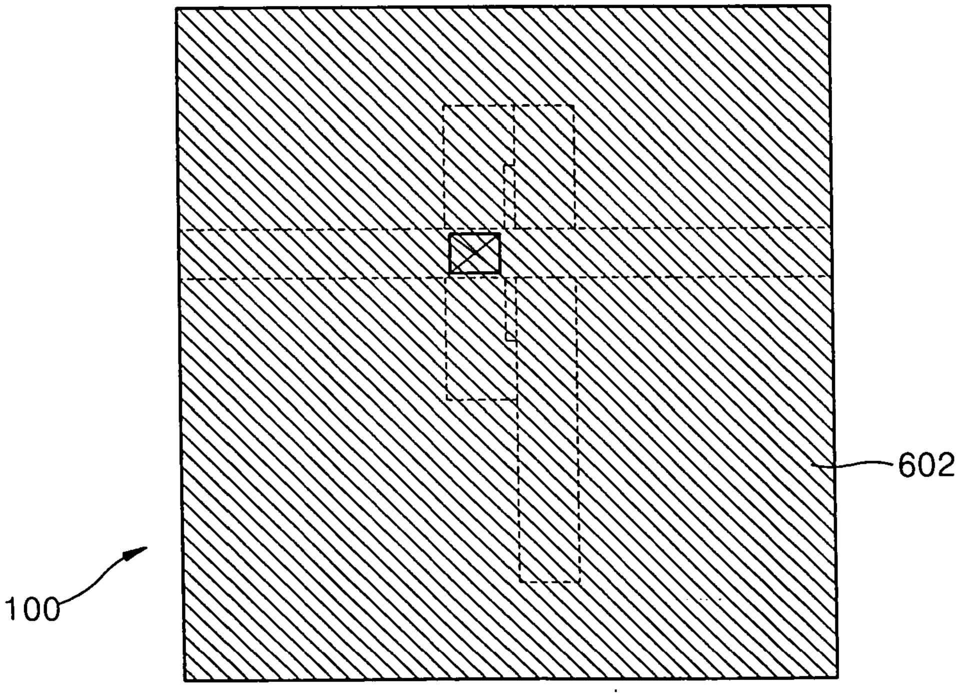
Figure 15G:
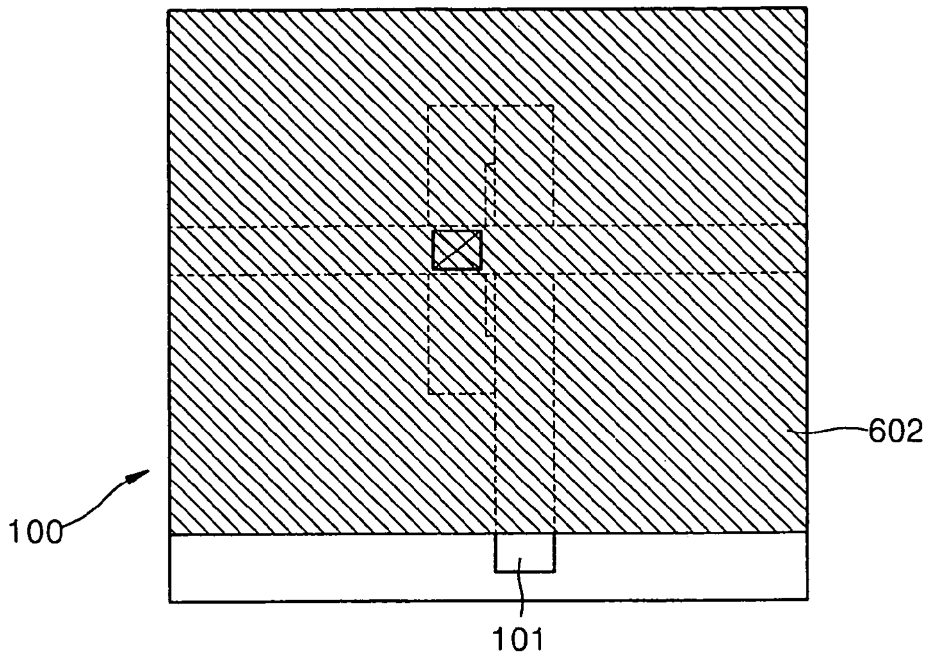

As shown in FIG. 15F, SiN or $SiO_2$ is deposited over the substrate 100 to form the second insulating layer 602, As shown in FIG. 15G, partial etching is performed on the second insulating layer 602 and the underlying first insulating layer 601 by photolithography so that a portion of the end of the individual signal line 101*a* may be exposed. Here, the exposed portion is the electrode pad 101.

Figure 15H:
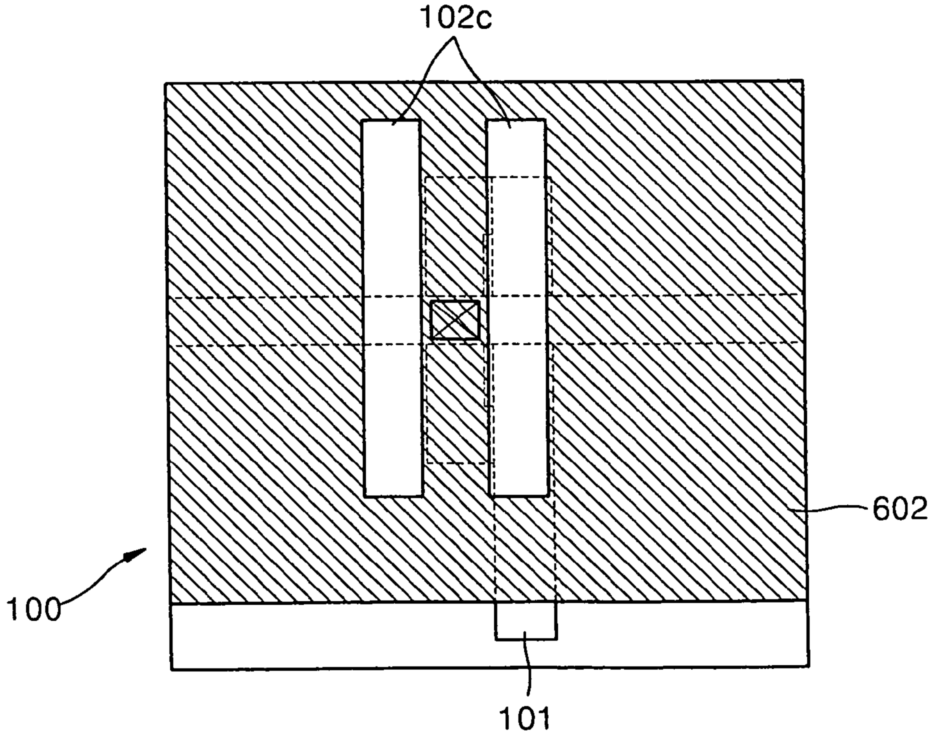

As shown in FIG. 15H, after having formed a film on the second insulating layer 602 by a thick-film forming process, the film is etched by photolithography to form the chamber walls 102*c* which extend parallel to the bubble generator 400 on either side of the bubble generator 400.

Etching techniques and film forming methods used in the above process are not described in detail. Of course, thin film growth and stacking and etching thereof, which are well known in the art, can be applied to the above process. In the ink-jet printhead according to the present invention as illustrated above, arrangement of a nozzle and a droplet generating structure associated therewith may be modified in various ways using the unit chambers and the bubble generator.

The ink-jet printhead according to the present invention can freely adjust the maximum amount of droplet ejected at one time within allowable range by controlling the interval between both heaters of the bubble generator, while ejecting droplets having a stable and uniform size.

Meanwhile, according to the ink-jet printhead shown in FIGS. 2-4, ink is supplied to the ink chamber on both short sides of the substrate. In addition to the structure, ink may be supplied to the chamber by forming a through hole that extends parallel to the isolation wall at the middle portion of two rows of the nozzles, that is, the portion adjacent to the isolation wall, or by removing the isolation wall and forming a long through hole instead.

As described above, the ink-jet printhead according to the present invention is constructed such that a unit chamber is provided for each nozzle and bubbles are generated chamber on both sides of a nozzle within the unit chamber, thereby effectively preventing a back flow of ink while facilitating adjustment of the size of ink droplet ejected through the nozzle. Furthermore, the ink-jet printhead according to the present invention allows for high-speed and high-pressure ink ejection with relatively low pressure compared to a conventional printhead. In particular, an ink channel having a simple structure is provided, thereby avoiding the clogging of the ink channel due to foreign materials while effectively preventing defectiveness of the printhead. Accordingly, the ink-jet printhead according to the present invention allows ink droplets to be ejected with a quick response rate and high driving frequency by virtue of the unit chamber and the ink feed channel.

What is claimed is:

1. A method of manufacturing a bubble-jettype ink jet printhead, comprising:

depositing, patterning, and etching a resistive material on a silicon substrate;

depositing, patterning, and etching an individual signal line over a portion of said resistive material;

depositing a first electrically insulating layer over said silicon substrate;

etching a hole in said first electrically insulating layer exposing a portion of said resistive material absent of said individual signal line;

depositing, patterning, and etching a common signal line, said common signal line being in electrical contact with said resistive material via said hole in said first electrically insulating layer;

depositing a second electrically insulating layer over said silicon substrate;

etching through a portion of said first and second insulating layers to expose a portion of said individual signal line in a region absent of said resistive material;

depositing, patterning, and etching a film to form a plurality of chamber walls, a first of said plurality of barrier walls being on top of a substantial portion of said individual signal line, and a second of said plurality of chamber walls being parallel to said first of said plurality of chamber walls, said second of said plurality of chamber walls being on an opposite side of said hole in said first insulating layer than said first of said plurality of chamber walls; and attaching a nozzle plate to a top portion of said plurality of chamber walls, said nozzle plate being perforated by a plurality of nozzle holes, one of said plurality of nozzle holes being directly above said hole in said first insulating layer.

2. The method of claim 1, said resistive material is patterned to be “P” shaped.

3. The method of claim 2, said individual line covers a straight portion of said “P” shaped resistive layer.

4. The method of claim 3, said hole in said first insulating layer is located over a center of a curved portion of said “P” shaped resistive layer.

5. The method of claim 4, one unit heater is located between one side of said center of said curved portion of said resistive layer and said straight portion of said resistive layer and another unit heater is located between another side of said center of said curved portion of said resistive layer and said straight portion.

6. A method of manufacturing a bubble-jet type ink jet printhead, comprising:

forming a plurality of resistive heater elements comprised of patterned resistive material on a substrate;

forming a patterned electrode layer on the substrate, the patterned electrode layer being electrically connected to the resistive heater elements;

forming a plurality of chamber walls over the substrate, wherein ones of the plurality of chamber walls separate one pair of resistive heater elements from another pair of resistive heater elements; and attaching a nozzle plate to a top of the plurality of chamber walls, the nozzle plate being perforated by a plurality of nozzle holes, each nozzle hole being disposed above a portion of the substrate between a pair of patterned resistive heater elements, each nozzle hole also being disposed between a pair of adjacent chamber walls.

7. The method of claim 6, further comprising forming an insulating layer over the substrate, over the resistive heater elements and over the patterned electrode layer, the plurality of chamber walls being formed on the insulating layer.

8. The method of claim 6, the resistive heater elements being formed in pairs, wherein chamber walls serve to separate one pair of resistive heating elements from another adjacent pair of resistive heater elements.

9. The method of claim 6, said electrode layer is deposited so that each pair of resistive heaters are electrically connected in series.

10. The method of claim 6, the chamber walls being adapted to group together said plurality of resistive heater elements in pairs.

11. The method of claim 6, ones of resistive heater elements within one pair of resistive heater elements not being separated from each other by the chamber walls.

12. The method of claim 6, wherein pairs of the plurality of resistive heater elements are dedicated solely to corresponding ones of said plurality of nozzle holes.

13. The method of claim 6, wherein there is a two to one correspondence between the resistive heater elements and the nozzle holes.

14. The method of claim 6, each of said chamber walls separating one pair of said resistive heating elements from other adjoining pairs of said resistive heater elements while separating individual ones of said nozzle holes from adjoining others of said nozzle holes.

15. The method of claim 14, wherein ones of each pair of resistive heater elements are not separated from each other by said chamber walls.

16. The method of claim 6, each of said chamber walls are rectangular in shape and having rectangular cross sections.

17. A method of manufacturing a bubble-jet type ink jet printhead, comprising:

forming a plurality of resistive heater elements comprised of patterned resistive material on a substrate;

forming a patterned first electrode layer on the substrate, the patterned first electrode layer being electrically connected to the resistive heater elements;

forming a first insulating layer over the substrate, the plurality of resistive heater elements and the patterned first electrode layer;

etching a hole perforating the first insulating layer to expose a portion of each resistive heater element;

forming a second electrode layer over the first insulating layer, said second electrode layer being formed in said hole to form electrical contact to each resistive heater element;

forming chamber walls over the substrate, the chamber walls separating pairs of patterned resistive heater elements from each other; and attaching a nozzle plate to a top of the plurality of chamber walls, the nozzle plate being perforated by a plurality of nozzle holes.

18. The method of claim 17, further comprising forming a second insulating layer over the first insulating layer and over the second electrode layer, wherein the chamber walls are formed on the second insulating layer.

19. The method of claim 18, further comprising etching back a portion of the second insulating layer to expose a portion of the first electrode layer.

20. The method of claim 17, said hole being formed over a portion of a resistive heater that is not covered by the first electrode layer.

* * * * *